United States Patent [19]
Westdijk et al.

[11] Patent Number: 5,452,408
[45] Date of Patent: Sep. 19, 1995

[54] METHOD OF ASSIGNING A PERTINENT INDICATION IN RESPECT OF COLOR BEHAVIOR TO A PICTURE ELEMENT TO BE IMAGED WITH A COLOR REPRODUCTION SYSTEM

[75] Inventors: Jacob A. Westdijk, Venlo; Jacobus H. M. Schonenberg, Velden; Monique G. M. Sommer, Eindhoven; Johannes Onvlee, Den Bosch, all of Netherlands

[73] Assignee: OCE'-Nederland, B.V., Venlo, Netherlands

[21] Appl. No.: 132,897

[22] Filed: Oct. 7, 1993

[30] Foreign Application Priority Data

Oct. 12, 1992 [NL] Netherlands ............ 9201761

[51] Int. Cl.$^6$ ............................................. G06T 11/00
[52] U.S. Cl. .................................. 395/131; 395/126; 395/132
[58] Field of Search ........ 395/119, 126, 127, 128–132, 395/133, 155, 161; 358/532

[56] References Cited

U.S. PATENT DOCUMENTS

| | | | |
|---|---|---|---|
| 2,918,523 | 12/1959 | Shapiro | 358/529 |
| 4,841,361 | 6/1989 | Matsunawa et al. | 358/532 |
| 5,319,742 | 7/1994 | Edgar | 395/131 |

FOREIGN PATENT DOCUMENTS

| | | |
|---|---|---|
| 0363146 | 4/1990 | European Pat. Off. . |
| 0395032 | 10/1990 | European Pat. Off. . |
| 0411911 | 2/1991 | European Pat. Off. . |

*Primary Examiner*—Almis R. Jankus
*Attorney, Agent, or Firm*—Birch, Stewart, Kolasch & Birch

[57] ABSTRACT

A method of selectively assigning to a picture element to be imaged with a color reproduction system a pertinent (permanent) indication relating to the distinguishing of color with respect to picture element, wherein, on the basis of the associated parameter values related to color saturation and intensity, a choice is first made for that picture element from a permanent indication of colorlessness a permanent indication of color behavior, and a provisional indication concerning an undefined color behavior. In the case of a picture element having a provisional indication, this indication is then converted to a permanent indication on the basis of the results of an analysis of the distribution of parameter values in the color space with respect to picture elements occurring within an environment of the associated picture element. According to this method, pastel hues can be reproduced in a logical and perceptually acceptable manner despite the presence of scanner noise.

20 Claims, 3 Drawing Sheets

METHOD OF ASSIGNING A PERTINENT INDICATION IN RESPECT OF COLOR BEHAVIOR TO A PICTURE ELEMENT TO BE IMAGED WITH A COLOR REPRODUCTION SYSTEM

BACKGROUND OF THE INVENTION

1. Field of the Invention

The invention relates to a method of assigning a pertinent (permanent) indication with respect to color behavior to a picture element to be imaged with a color reproduction system and to the color reproduction system.

2. Discussion of Related Art

In the reproduction of colored information on information supports in a color reproduction system, a problem arises as to the way in which pastel hues can be reproduced in a perceptually acceptable and yet economically viable way. As the degree of saturation of a pastel color further decreases in proportion with respect to a picture element to be reproduced, at some time a point will be reached at which it is perceptually no longer logical to reproduce as such the color information associated with such a pastel color but, instead, as grey information. This also has the advantage that only a black reproduction unit is required to operate in the color reproduction system, and not one or more other color printing units as well, and this means less expensive operation of the system and reduced wear therein.

The boundary line to be drawn in a color space to obtain a transition between achromatic and chromatic reproduction of picture information should first be determined on perceptual and technological grounds. This problem has already been addressed in U.S. Pat. No. 2,918,523. However, in this case, for the sake of simplicity, achromatic reproduction of pastel colors has been selected, although this does not produce a satisfactory result. A picture element which perceptually will be considered as colorless and which is in the neighborhood of the boundary may, as a result of scanner imperfections (such as scanner noise), be detected, not as colorless, but as color-bearing, or vice versa. This occurs particularly in the case of picture elements situated close to the transition from the colorless area to the color-bearing area in the color space. An additional factor to be taken into account is that the scanner noise increases in proportion as the intensity of the picture element increases. It is therefore logical to distinguish in a color space a kind of uncertainty area which includes parts situated on either side of the boundary and in which, because of the possible occurrence of scanner noise, a picture element occurring there may not automatically be assigned a color behavior or a colorless behavior (colorlessness) on the basis of its parameter values, but only a provisional indication concerning an undefined color behavior. Each picture element occurring in that uncertainty area must then be subjected to a further and more detailed test to arrive at a more pertinent if not permanent, indication or label with respect to color-bearing or colorless behavior. Distinguishing between picture elements having a pertinent indication of color behavior, picture elements having a pertinent indication of colorless behavior, and picture elements having a provisional indication concerning an undefined color behavior, is already known from EP-A-0395032. In the system described therein, however, the entire area of picture elements with a provisional indication is sacrificed for the elimination of register errors, a picture element becoming colorless in the case of a text picture, and having color if a color picture is involved. The elimination of scanner noise errors is therefore not addressed here. Distinguishing between picture elements having a pertinent indication of color behavior, picture elements having a pertinent indication of colorless behavior, and picture elements having a provisional indication concerning an undefined color behavior, is also known from EP-A-0363146 and EP-A-0411911, in which use is made of certain comparison criteria which, however, are tested in a space derived from the RGB color space and defined by the maximum and minimum color component values with respect to a picture element in such color space. A method of this kind requires considerable computing work. The maximum and minimum color component value must first be determined with respect to each picture element and then a set of mathematical inequality functions must be examined to define the area that picture element forms a part of. For a picture element having a provisional indication concerning an undefined color behavior, a pertinent indication with respect to a color-bearing or colorless behavior is then determined in this patent publication by reference to an environmental analysis. The environmental analysis to be performed under these conditions means comparing the number of pertinent indications relating to color behavior in an environment (e.g. a 5×5 picture element space) around the associated picture element, with the number of pertinent indications relating to a colorless behavior, the result thereof then indicating what type of pertinent indication must be assigned to the associated picture element. An environmental analysis of this kind, however, is intended to trace and eliminate register errors but not to eliminate scanner noise errors. The said environmental analysis also has the disadvantage that it produces unreliable results in an area of soft pastel hues, since relatively few or no pertinent indications with respect to a color behavior or colorless behavior occur in such an area. In an area of soft pastel hues this can result in rapid variations in the type of pertinent indications to be assigned to successive picture elements, although they may not be reproduced differently according to the original. Also, in an area having soft pastel hues in which there are few picture elements with a pertinent indication, a small majority of one of the types of pertinent indications may, during the performance of the environmental analyses, cause the excess proportion of the provisional indications to be replaced by pertinent indications of the majority type, resulting in an incorrect color impression.

SUMMARY OF THE INVENTION

Therefore, it is an object of the present invention to provide a color reproduction system which will overcome the above noted disadvantages.

A further object of the present invention is to provide a solution with respect to the disadvantage relating to fast variations in the pertinent (permanent) indications, which can be designated "rapidly switching" in color picture processing.

The foregoing objects and others are accomplished in accordance with the present invention, generally speaking, by providing a method of assigning a pertinent indication with respect to color behavior to a picture element to be imaged with a color reproduction system.

The method of the present invention is characterized by:

a. locating a picture element, on the basis of at least the parameter values of the the picture element related to color saturation and intensity, with respect to a defined sub-space within a color space, such sub-space being considered as an uncertainty area with respect to color behavior, the color space being defined by at least the parameter values of the picture element, b. performing, with respect to the the picture element upon locating in the the uncertainty area, an analysis of the distribution of the parameter values, of the color space, of picture elements occurring within an environment of the picture element, and c. assigning a pertinent indication to the instant picture element on the basis of the analysis.

The color reproduction system is provided with means for generating color information point by point, and provided with a picture processing and control unit for correcting and processing this color information to provide control signals for controlling a color printing unit, the picture processing and control unit being adapted to perform such a method.

The instant invention is predicated on the principle that in circumstances relating to fast variations in the pertinent indications, which can be designated "rapidly switching" in color processing, it is statistically advantageous, in underpinning a pertinent indication, not to rely solely on pertinent indications occurring sporadically in the associated environment, but preferably on, for example, data related to directly connected measuring results or which have a close relationship thereto. In a first aspect of the method according to the present invention, a picture element located in the uncertainty area is assigned a pertinent indication of color behavior if the relative distribution of the parameter values related to color with respect to the picture elements occurring in the environment remains within predetermined limits and/or the average value of the parameter values related to color saturation for the picture elements occurring in the environment exceeds a certain threshold.

In a second aspect of the method according to the present invention, a picture element located in the uncertainty area is assigned a color fulfillment degree which represents the expectation value of a picture element with respect to color behavior, and which can be based on an angle information, to be determined in the LC color sub-space, associated with a straight line passing through the coordinate pair in that space representing the picture element and a predefined point in that space. In these conditions a picture element having a provisional indication is given a specific pertinent indication if the average value of the fulfillment degree in that is situated in the value area associated with that specific pertinent indication. Advantageously, the analysis is based solely on those picture elements to which a partial color fulfillment degree is assigned. It is also possible to make the pertinent indication of a picture element dependent on the total value of the color fulfillment degree of the associated picture element and on a specific fraction of the average value of the color fulfillment degree in that environment.

An extremely favorable use of the method according to the instant invention to eliminate scanner imperfections is obtained by either beforehand or simultaneously first eliminating the influences of the systematic errors, such as register errors, caused by the scanner. Since these are very disturbing at black-white transitions, as in the case of text, a test is carried out by reference to the original color information with respect to each picture element whether such picture element has such a transition and in that case a picture element of this kind is assigned a pertinent indication of colorless behavior (colorlessness). Many solutions are known for the detection of black-white transitions. As a criterion, for example, a transition of this kind is present at a picture element under investigation if a considerable brightness transition occurs around such picture element and such picture element is situated in an area of low color saturation.

According to the method of the present invention as described, the picture processing and control unit of the color reproduction system which performs the method is also provided with:

(a) memory means with positional data concerning a defined sub-space within a color space, such sub-space being considered an uncertainty area with respect to color behavior, the color space being defined at least by parameters related to color saturation and intensity, (b) selection means for selecting a picture element having positional data within the uncertainty area by means of the memory means, (c) computing means for performing an analysis of the distribution of parameter values related to the color space with respect to picture elements occurring within a defined of the picture element, and (d) means for assigning a pertinent indication on the basis of the results of the analysis performed with respect to the picture element.

The invention will be explained using the perceptually arranged LCH color space, although the invention can also be applied to other related color spaces such as the HSL or CIELAB color space.

BRIEF DESCRIPTION OF THE DRAWINGS

The invention will now be described in detail with reference to the accompanying drawings wherein.

DETAILED DISCUSSION OF THE INVENTION

Figure 1:
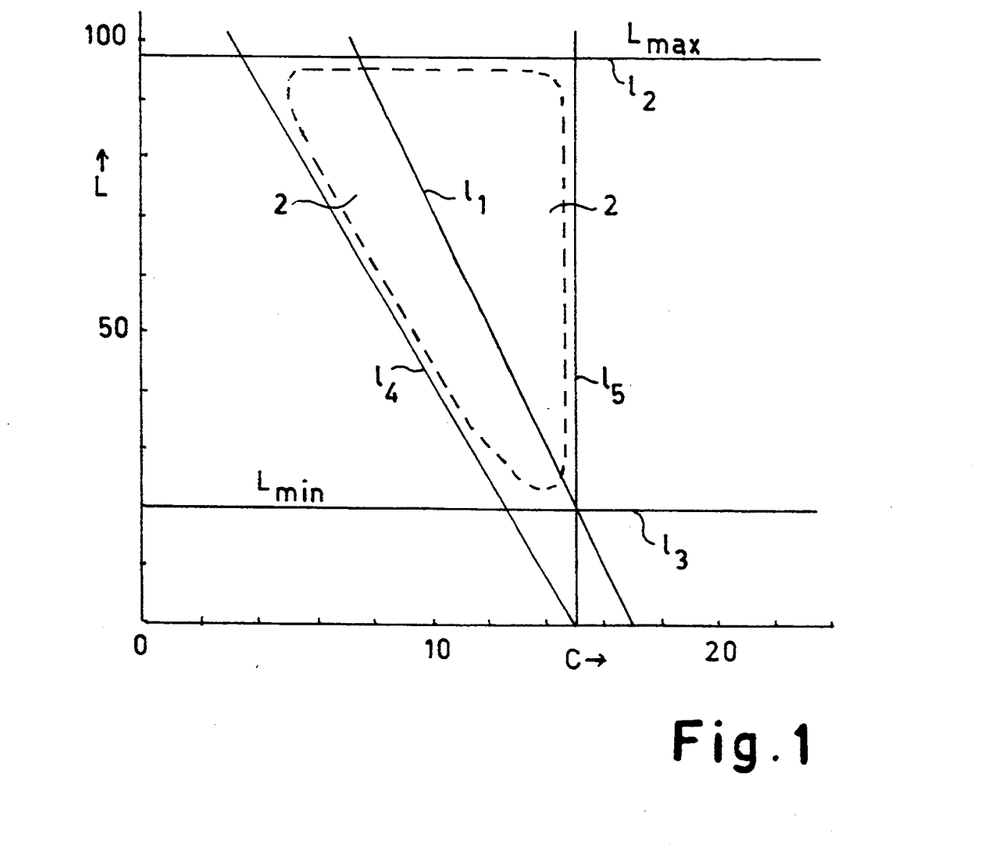
FIG. 1 represents a mathematically based graphical distribution of the picture elements concerning their perceptually assessed color aspects in the LC color sub-space.

From perceptual observations made on color reproductions produced by a color reproduction system provided with a unit for scanning an original point by point and generating associated color information, these reproductions may contain picture elements which must certainly be reproduced in color in the reproduction process, while there are also picture elements which are logically reproduced as colorless and hence only with a certain grey value. A graphic representation of a distribution of these two types of picture elements in the LC space as a sub-space of a LCH color space is represented in FIG. 1. In this Figure, $l_1$ a parting line is denoted, the picture elements on the left of which a colorless aspect is to be assigned, while a color-bearing aspect is to be assigned to elements on the right of that line. The colorless or color-bearing aspect of a picture element may be added in the form of a binary representation to the data string for the picture element. For reasons of a perceptual nature it is also acceptable to consider picture elements having a luminance (or brightness) above a certain value ($L_{max}$) or having a luminance below a certain value ($L_{min}$) as colorless only. Accordingly it is logical, consistent with these principles, to effect analysis into the color-bearing or colorless behavior of the picture elements for the purposes of a correct copying process. However, it is possible that due to scanning imperfections (such as scanner noise), a scanner attributes certain color aspects to certain picture elements which perceptually should be considered as colorless. The converse also occurs for the same reason. In other words, FIG. 1 contains an area 2 extending on either side of the parting line $|_1$, in which area picture elements of this kind occur and in which the colorless or color-bearing behavior of a picture element as perceived by the scanner may be termed unreliable. The magnitude and situation of this area 2 can be determined empirically. Thus, the degree of color or colorlessness of a picture element and its reliability are defined as a function of its position in the LC sub-space. The scanner noise appears to be dependent on the luminance. In the case of light hues (high luminance), scanner noise and hence the uncertainty area are greater than in the case of darker hues (low luminance). The picture elements in the LC sub-space can therefore be divided into three categories as a result of the introduction of the uncertainty area 2, namely:

(1) picture elements having a pertinent indication of colorless behavior; these elements occur in the area situated to the left of the parting line $l_m$ not covered by area 2, and also in the area above the line $l_2 \equiv L = L_{max}$ and in the area below the line $l_3 \equiv L = L_{min}$, (2) picture elements having a pertinent indication of color behavior (color-bearing behavior); these elements occur in the area situated to the right of the parting line $l_1$ not covered by area 2, and not situated above the line $l_2 \equiv L = L_{max}$ or below the line $l_3 \equiv L = L_{min}$, and (3) picture elements having a provisional indication concerning an undefined color behavior; these elements are situated in area 2.

A test to be performed in this way and designated an LC-test gives a distribution of the picture elements in accordance with the three kinds of indication. The last indication is provisional because it is intended that each picture element having such an indication will be assigned one of the two types of pertinent indication after a supplementary test. Each of the indications can technically be assigned as a specific label to the associated picture element.

Whether a pertinent indication of colorless behavior, a pertinent indication of color behavior, or a provisional indication of an undefined color behavior should be assigned to a picture element in an initial test can be determined by means of a memory (such as a "look up table"), in which the associated indication is recorded for each pair of picture element coordinates in the LC sub-space. This provides a rapid determination of the type of indication for each arbitrary picture element. Another possibility of determining the indication associated with a picture element is to imagine that the uncertainty area 2 in the LC sub-space is enclosed by a number of mathematically composed line elements. As shown in FIG. 1, this is possible, for example, by means of the line elements:

$l_2 \equiv L = L_{max}$, $l_3 \equiv L = L_{min}$, $l_4 \equiv C = Co - d.L$, and $l_5 \equiv C = Cl - e.L$.

Here, Co and Cl are suitably selected constants and d and e are suitably selected direction coefficients.

A picture element having the coordinate pair (L,C) is then assigned the provisional indication of an undefined color behavior if all the following conditions are satisfied:

$L < L_{max}$, $L > L_{min}$, $C > Co - d.L$, and $C < Cl - e.L$

A picture element is assigned the pertinent indication of color behavior if the following conditions are satisfied:

$L < L_{max}$, $L > L_{min}$, and $C \geq = Cl - e.L$.

The other elements receive the pertinent indication of colorless behavior. The supplementary test for assigning one of the two pertinent indications to a picture element in area 2 can be performed as an analysis, in which, in an environment of this picture element considered as the central picture element, it is possible to determine by reference to specific characteristics of the surrounding elements whether the central picture element should be assigned a pertinent indication of colorless behavior or a pertinent indication of a color behavior.

A first method of processing picture information for such analysis is based on the principle that a cluster of identical picture elements which actually merit the predicate "purely colorless" are, as a result of scanner imperfections such as scanner noise, nevertheless assigned color or hue values which, apart from systematic deviations in the detection capacity, occur stochastically around the grey value axis or L axis in the LCH space and are therefore distributed over the entire or substantially entire color or hue range. However, the further a cluster of identical picture elements is situated away from the grey value axis and hence should increasingly be considered as color-bearing, so a systematic contribution of a certain color or hue value must be added vectorially to the stochastically distributed color or hue values. This, in turn, has the effect that in proportion as a cluster of identical picture elements is situated further away from the grey value axis, so the aperture angle at which a cluster is viewed from the grey value axis (L=0 and C=0) decreases. The standard deviation in the measured color or hue values as a result of scanner noise will then also decrease. However, in proportion as a cluster of picture elements is situated closer to the grey value axis, there will be an increase in the standard deviation around the average color or hue value. Thus, when the standard deviation appears to be greater than a certain constant f, it may be assumed that it is apposite to assign the pertinent indication of colorless behavior to the central picture element. Expressed as a formula, this analysis, which may be designated a "hue test", yields the following:

$$\sigma(H) > f$$

If this condition is satisfied, there is a real likelihood that the central picture element is colorless. A cluster of picture elements for such analysis may, for example, consist of the picture elements of an n×n raster, e.g. a 5×5 raster around the central picture element under test. Instead of calculating (H), it is possible simply to calculate the sum of the moments as constituents of the standard deviation. Expressed as a formula the following then applies:

$$\sum_i \overline{(H - H_i)^2} > f^*$$

where $H_i$ represents the hue value of the $i^{th}$ picture element, $\overline{H}$ ms the average hue value in this distribution, and f* ms a suitably selected constant derived from f. The standard deviation also forms a measure of the width of a normal distribution. For a normal distribution of this kind, 97% of the picture elements is situated in an area having a width equal to six times the standard deviation (6.$\sigma$) and being situated around the average. On this basis, it may be assumed that if the distribution of the measured color or hue values of a cluster of picture elements remains below the limit 6f, there may be said to be a color behavior of the central picture element of this cluster. Expressed as a formula this becomes:

$$(\Delta H)_{max} < 6f$$

This derived criterion, therefore, forms a second method of processing picture element information in accordance with the principle of the invention, this being preferred to the criterion relating to standard deviation, for implementation reasons.

In a third method of processing picture element information in accordance with the principle of the invention, a supplementary requirement is included in order to make more reliable the decision as to assigning or not assigning a colorless aspect to the central picture element. For this purpose, a test must be made whether the picture elements in the cluster around picture element have an average color saturation value (chroma value or saturation value) greater than a certain constant b. This yields the formula:

$$(\Delta H)_{max} < 6f \text{ and } C\text{-mean} > b.$$

Figure 2:
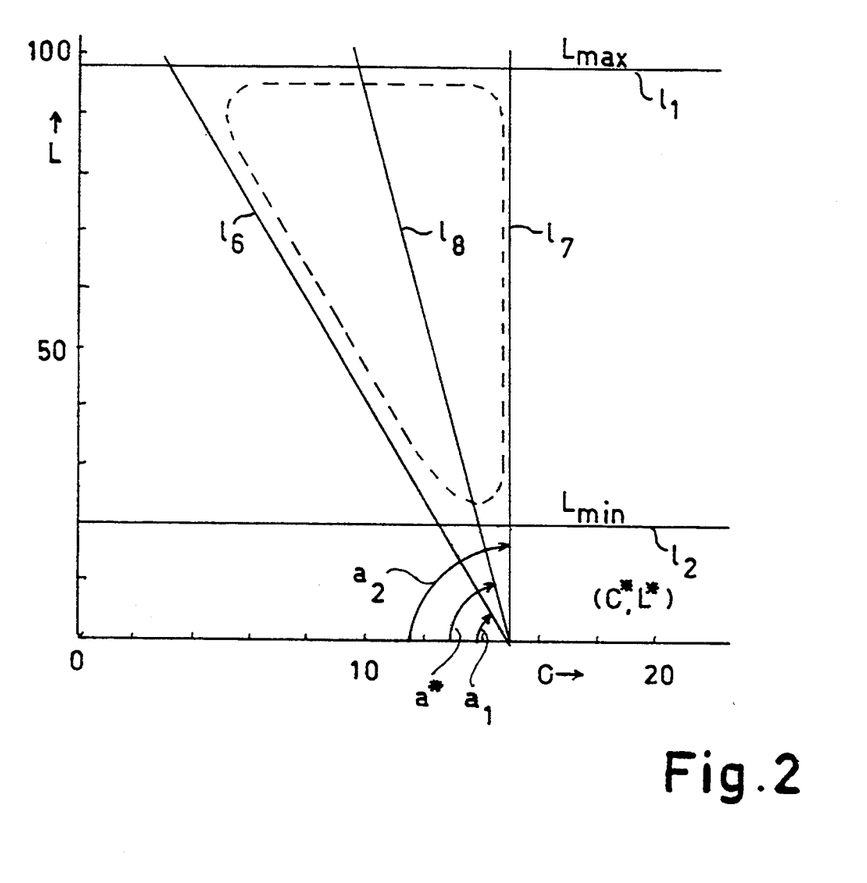
FIG. 2 shows a distribution of the picture elements represented in FIG. 1, but based on other mathematical principles.

If this condition is satisfied, the central picture element is assigned a pertinent indication of color behavior. If, on the other hand, either of the two conditions is not satisfied, then the picture element may be said to have a colorless behavior. Another way of determining, in an LC test, whether a picture element situated in the uncertainty area should be given the pertinent indication of colorless behavior or color behavior, is based on applying the principles of fuzzy logic, and is founded based on the principle that in proportion as a picture element is closer to the area of the color-bearing picture elements, such picture element, in all probability has a higher degree of color potency, which will hereinafter be referred to as "color fulfillment degree" (COLfd). A possible development of this idea is shown in FIG. 2, in which two parting lines 16 and 17 are drawn in the LC sub-space along and on either side of the uncertainty area 2. When 16 as a parting line between the colorless area and the uncertainty area forms an angle a1 with the negative C-axis and the intersection of 16 and 17 is given by (C*,L*), then 16 can be reproduced by the equation:

$$l_6 = L^* - tg(a_1).(C-C_,)$$

Similarly, line 17 by:

$$l_7 = L^* - tg(a_2).(C-C_,)$$

where $a_2$ is the angle made by line 17 and the negative C-axis. These two lines form part of a bunch of lines which are mathematically described by $l_8 = L^* - tg(a).(C-C^*)$. In practice, it may be stated that: $l_6 = l_4$ and $l_7 = l_5$. If a picture element is situated on the left of the line $l_6$, in which case, therefore, $a < a_1$, this picture element is assigned a COLfd of 0 because of the colorless character, and this therefore represents a pertinent indication of colorless behavior. On the other hand, a picture element situated on the right of the line $l_7$, and for which, therefore, $a > a_2$, is assigned a COLfd of 1 because of the color-bearing character of this picture element. This represents a pertinent indication of color behavior. However, a picture element situated between the lines $l_6$ and $l_7$ and situated on line $l_8$ with a directional coefficient tg(a*) from the line bunch, is assigned a partial fulfillment degree COLfd of $(a^* - a_1)/(a_2 - a_1)$, representing a provisional indication of undefined color behavior. It follows from this that each picture element in the LC sub-space is assigned a fulfillment degree situated in the segment [0, 1]. In this connection it should be noted that the fulfillment degree COLfd is 0 in the case of the colorlessness of the picture elements having $L > L_{max}$ and those having $L < L_{min}$. Although it is possible to calculate the associated directional coefficient a*, and from that the COLfd value by reference to the measured L and C coordinates for each picture element, quicker determination of the COLfd value is obtained by means of a memory unit such as a look up table, which directly yields the associated COLfd value for each pair of L and C coordinates to be supplied.

Just as was the case in the previous embodiments, here again it is necessary to replace the provisional picture element indications by pertinent indications, and this is possible by two methods of processing picture element information in accordance with the principle of the invention as described in detail hereinafter.

According to a fourth method of processing picture element information, in an environment (for example a 5×5 picture element raster) around a picture element to be designated the central picture element, the average is calculated of the COLfd values of all of the picture elements situated around the central picture element as far as they originally had or still have at least a provisional indication, and hence have COLfd values situated in the interval (0, 1).

Expressed as a formula:

$$\overline{COLfd} = \frac{1}{N} \cdot \sum_{\substack{i=1 \\ i \neq 13}}^{25} (COLfd)_i$$

for $(COLfd)_i \neq 0$ nor $1$ and N = number of picture elements with $(COLfd)_i \neq 0$ nor 1 If this average COLfd value is above 0.5 or equal to 0.5, then the central picture element is assigned a pertinent indication of color behavior to replace its provisional indication; if, however, the average value is below 0.5, then the central picture element receives a pertinent indication of colorless behavior.

According to a fifth method of processing picture information, an average of the COLfd values is again calculated, and then a certain fraction (k) of this average $\overline{COLfd}$ is added to the COLfd value of the central picture element (with index 13), whereafter the resulting value is normalized by a factor $1/(1+k)$ to give an end value COLfd* to the central picture element with:

$$(COLfd^*)_{13} = \frac{(COLfd)_{13} + k \cdot \overline{COLfd}}{k+1}$$

If this end value is above 0.5, then the central picture element is assigned a pertinent indication of a color behavior; otherwise a pertinent indication of a colorless behavior.

Figure 3:
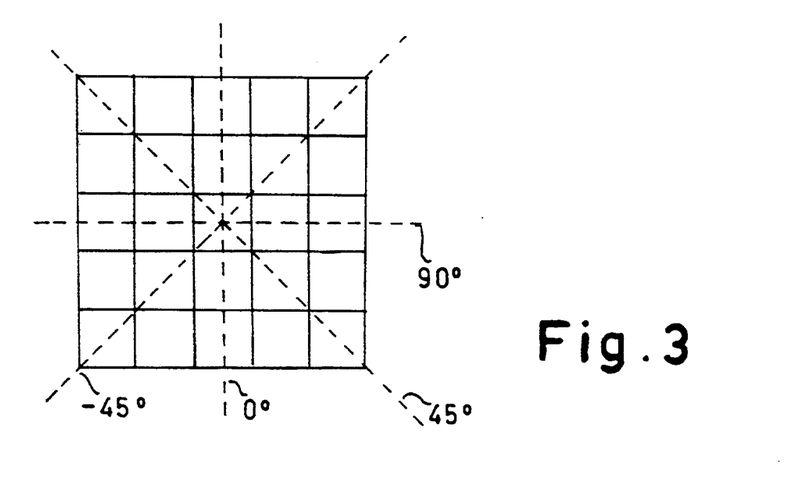
FIG. 3 shows a picture element raster required for performing the method.

There are picture elements in the uncertainty area which, on the basis of the foregoing, are considered as color-bearing whereas in fact they should have been considered as colorless. This concerns picture elements at the edges of black-white transitions and which, as a result of register errors in a color scanner exhibit a color tinge along the transitions. Register errors are the result of the fact that the separate measurements for the different color coordinates R, G and B do not take place at exactly the same point as a result of the true geometry of the color-CCD. This is virtually not striking in an even (colored) surface, but it is at the edges in the case of color transitions and even more in the case of black-white transitions. The latter then results in situations in which a method of processing picture element information as already discussed recognizes color at black-white edges. This type of color behavior should be considered a systematic deviation of the scanner process and not as a result of a stochastic process in the scanner. It is accordingly advantageous if picture elements having the picture errors due to this type of color tinge are selected for their systematic character prior to or simultaneously with a picture element information processing method as described above, and to decide on whether or not there is a colorless behavior with respect to these picture elements with suitable criteria, in such manner that at least as many black-white edges with a color tinge as possible are replaced by ideal black-white edges. Thus for each picture element it is necessary to check by reference to the original color information whether there is such a transition present at that picture element and if so a picture element of this kind is assigned a pertinent indication of colorless behavior. A number of methods are known for this purpose from the prior art, some of which are given in U.S. Pat. No. 4,415,920, EP-A-0349780, EP-A-0369720 and EP-A-0411911. A particularly favorable method is based on the principle that there is a considerable brightness transition around such a picture element and that such a picture element is situated in an area of low color saturation. An algorithm adapted to this comprises two steps: during the first step a check is made whether the central picture element forms part of an edge with a sufficiently strong brightness transition, and this is therefore anticipatory of the presence of a black-white transition. A check is also made as to the direction in which this edge is situated. For this purpose, in a raster of, for example, 5×5 picture elements, four standard edges with different orientations are assumed around the central picture element as shown in FIG. 3. The first edge or the 0-degree edge extends vertically through the raster; the second edge or 90-degree edge extends horizontally through the raster; the third edge or 45-degree edge extends from the top left-hand corner to the bottom right-hand corner; and the fourth edge or 45-degree edge extends from the bottom left-hand corner to the top right-hand corner. Each standard edge gives a division of the raster into two sub-rasters, and for each of the sub-rasters the maximum and minimum brightness values (or intensity values) of the picture elements occurring therein are determined. Advantageously, the picture elements situated on an edge are not included in the determination of the brightness value in such a sub-raster. Of all the standard edges, that edge is selected where the difference between the maximum brightness value of one sub-raster and the minimum brightness value of the other sub-raster is greatest. A check is then made with respect to the selected edge as to whether the difference between the maximum and minimum brightness value is greater than a certain boundary value g. Expressed as a formula:

$$(\Delta L)_{max} > g$$

Only if that is the case the selected standard edge is considered as a potential black-white edge, since there are usually no considerable variations in luminance in the case of a color edge transition. If the difference is not greater than the boundary value g, the test for a black-white edge for that picture element is terminated and it is therefore assumed that this picture element does not form part of a black-white edge. If a standard edge is considered as a potential black-white edge, the second step is started. In the second step, the average chroma value (Cmean1; Cmean2) is determined for the potential edge in each of the two sub-rasters, and from this an assessment is made as to whether there is a color tinge present. Here again it is advantageous not to include in the determination of the average chroma value those picture elements which are situated on the potential edge. If the average chroma value of each of two sub-rasters remains below a certain boundary value h, hence Cmean1<h and Cmean2<h, it may reasonably be assumed that there is little or no color present here and that the potential edge may be considered as a true black-white edge. The central picture element in question is then considered colorless (with chroma value 0). In order to obtain more certainty as to the presence of a black-white transition, the following can be tested as a supplementary requirement: 1 Cmean1−Cmean2 1<n, where n is a constant. Perceptually, however, an undesirable edge black replacement in the case of color surfaces having weak saturation and for certain color transitions from background to color, has no disturbing influence on the entire result.

From the aspect of technical considerations, it is preferable for a picture element which is thus considered as colorless to be additively assigned a separate label (bit) and not to have it operate as a substituent of the original measured value, since this measured value may later be important for a subsequent analysis into colorless behavior or color behavior of neighboring picture elements. The picture elements which are not designated colorless on the basis of the edge black replacement algorithm should then be subjected to an analysis for colorless behavior or color behavior in accordance with one of the picture information processing methods discussed in connection with FIGS. 1 and 2.

Despite the use of the black edge replacement algorithm and carrying out the analysis as to colorless behavior or color behavior on the picture elements, it may happen that some picture elements are nevertheless still wrongly considered colorless or color-bearing where an opposite designation would be correct. This is because compromises must always be made with respect to the ideal processing when determining the critical values applied. In particular, in the case of black-white transitions, picture elements with a specific color may be left over as a result of register errors. Picture elements of this kind having an incorrect classification are then re-tested with a post-processing algorithm. According to this algorithm, a picture element considered to have color behavior can be rendered colorless if, for example, many picture elements having a pertinent indication of colorless behavior occur in a certain environment of such picture element (and hence few picture elements having a pertinent indication of color behavior, e.g. less than 10%), and the luminance contrast is high (something which again appeals to the occurrence of black-white text in the environment of the picture element under test). The environment in which this post-processing algorithm is operative is formed by a picture element raster which can be made fairly large, e.g. a 16×16 raster or even better 25×25 (625) raster.

In accordance with this principle, it is logical if a picture element considered to have color behavior is made colorless in the case of the latter raster if the following equation is satisfied:

$$\sum_{i=1}^{625} k_i < 63 \text{ and } (\Delta L)_{max} > g$$

where g is a constant. Here k=1 or 0 if the $i^{th}$ picture element has color behavior or colorless behavior respectively.

A favorable result is also obtained if this post-processing algorithm is carried out in a 25×25 raster with half the resolution.

Although determination of the formula $$\sum_{i=1}^{625} k_i < 63$$

actually involves colorless picture elements, it makes little or no difference in practice to include picture elements with color behavior for the sake of simplicity. This provides a saving of one picture element selection mechanism. Instead of $(\Delta L)_{max} > g$ an alternative criterion can be used with good results and better implementation possibilities, namely it is necessary to satisfy the two requirements that there should be a minimum number of picture elements with a luminance above a certain high threshold and a minimum number of picture elements with a luminance below a certain low threshold. A post-processing algorithm can also be used for an operation in the reverse direction, i.e. to give an indication of color behavior to a colorless picture element in a substantially colored environment in order to obtain better uniformity in the color reproduction.

Figure 4:
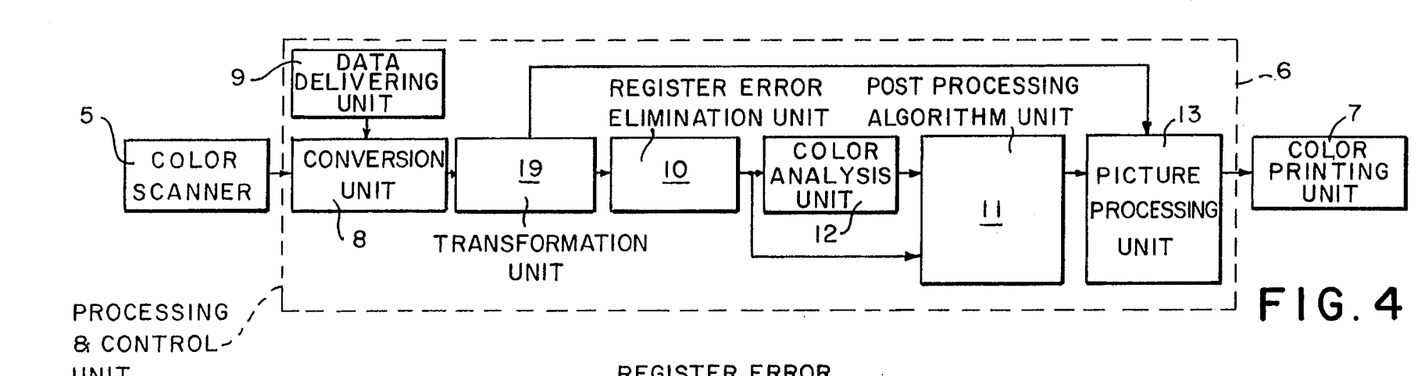
FIG. 4 diagrammatically illustrates a possible embodiment of a part of a color reproduction system.

FIG. 4 diagrammatically illustrates an embodiment of part of a color reproduction system provided with a color scanner or color scanning unit 5 for scanning an original point by point and generating associated color information. In this, light intensity measurements are carried out by means of a scanner for every scanned point on the successive scanning lines of the original subjected to exposure, and after a number of corrective system steps and picture processing steps have been performed the measurements are suitable for conversion to control signals for the color printing units of the color copier, or other color reproducing means such as a "flying spot scanner". Scanners usable for performing the method of the invention are indicated throughout by the English term "line scanner". This does not mean that a "line scanner" must consist of a single row of light-sensitive elements. Reasons associated with manufacturing technology and financial considerations have often led to other embodiments of scanning means being developed which with some adaptation are considered suitable for measuring intensity signals line by line and for each scanned point for each desired color component. Some embodiments of scanning means suitable for the purpose are known from GB-A-2157114, U.S. Pat. Nos. 4,553,160; 4,750,048 and 4,866,512. In principle, the "area-scanners" can also be used for performing the method according to the invention, it being possible to perform the steps according to the invention in two ways, in the case of the parallel reading out of the line arrays: on the one hand it is possible from a memory in which the read-out intensity information for each scanned point and for each color component is first stored. On the other hand, during the reading out of the intensity information the method according to the invention can be performed by performing the method line by line in a direction at right angles to the read-out direction of the line arrays. The successively arranged line arrays thus each deliver the intensity information of a single scanned point, and this is then used to determine the white reference value for each scanned point and each color component for the line defined by the scanned points.

Instead of scanner it is also possible to use a receiving unit forming part of a communication system (e.g. a facsimile system). The color reproduction system is also provided with a picture processing and control unit 6 for correcting this color information, the assessment regarding color behavior or colorless behavior taking place for each picture element. The picture processing and control unit 6 is also suitable for processing color information obtained via the correction phase in order to produce control signals for controlling a color printing unit 7 adapted to multi-color printing. For each picture element, the color components R, G, B measured by a scanner 5 are converted to the LCH color system in unit 8. During this conversion, the R, G and B coordinates are first converted to the XYZ color space via a matrix multiplier, the matrix coefficients of which are scanner-dependent. A conversion to the CIE-LAB system then takes place in the manner described in R. W. G. Hunt: "The Reproduction of Color in Photography, Printing & Television"; Fountain Press, England, 4th edition, para. 8.8. The data concerning the (white) reference point associated with the background of the original must be taken into account in this case, such data being delivered by unit 9. The conversion then takes place to the LCH color system as described in the book by Hunt. The white reference point should be determined accurately, since otherwise the grey value axis will be incorrectly determined in the LCH color system so that the uncertainty uncertainty area with the provisional indications of possible colorless or color behavior will be incorrectly disposed in the LCH color system with adverse consequences with respect to the color/colorless investigation of the picture elements. Determining the white reference point is described in detail in: GB-A-1541578, EP-A-0188193, NL-A-9101301 and NL-A-9101894. Of course, when facsimile equipment is used which receives the picture information in the required color system, the LCH system in this case, the units 8 and 9 are kept out of the operational part of the system. Information concerning the indications relating to color behavior, colorless behavior or undefined color behavior are then added to each picture element in unit 8. For this purpose, unit 8 comprises memory means, e.g. a look up table, with positional data defined in the LCH space with respect to the various indications concerning color behavior. Before the further analysis into color behavior is performed, a check must first be made as to whether the color parameter values supplied for each picture element actually are situated within the color reproduction space of the color printing unit 7. If this is not so, the color parameter values of the associated picture elements should be transformed to the color reproduction space of the color printing unit 7. This can be done by "clipping" the parameter values, the transformation being so effected that the parameter values obtainable are situated on the envelope of the color reproduction space. Instead of clipping, it is also possible to compress color parameter values, although this has adverse effects, for example in the case of the repeated copying of generation copies, and which are also related to the position of the uncertainty area 2. The transformation takes place in unit 19. Of course the parameter values originally situated outside the enveloping edge will without difficulty be given a pertinent indication of color behavior, and this need not be discussed further in connection with tracing and eliminating register errors. The transformed parameter values can be fed directly with the associated indication to a unit 13 in which the usual picture processing steps, such as UCR and half toning, and determination of control data for the color printing unit 7, take place. The picture elements are then fed successively to a unit 10 in which the picture elements with color parameter values not subjected to the said transformation in unit 19 are subjected to the algorithm for the elimination of register errors.

The picture elements which, as a result of this algorithm, have been given a chroma value 0 in unit 10 are no longer tested by analysis into color behavior or colorless behavior. The colorless label of such a picture element is made directly available to unit 11 for the post-processing algorithm. The L, C and H values originally associated with that picture element are indeed fed to a unit 12 for analysis of color behavior or colorless behavior, since these values may still be of importance to investigation at neighboring picture elements. In unit 12 the picture elements to be investigated are subjected to analysis to determine a pertinent indication concerning colorless or color behavior. Each picture element which has not yet been given a colorless label with chroma value 0 on the basis of the edge black replacement algorithm is here given a label regarding the pertinent indication of colorless behavior or color behavior. In other words, a picture element is only assigned a pertinent indication of colorless behavior to replace any other pertinent indication if such picture element has at least one pertinent indication which is colorless. Each picture element is then offered to unit 11 for the post-processing algorithm either with the colorless label obtained by unit 10 or with a label obtained by unit 12, and a number of labels having the indication of color behavior are corrected to that of colorless behavior. Of course each picture element having a colorless label assigned also receives a chroma value or saturation value of 0. After a label indicating a color or colorless behavior has been assigned to each picture element, further processing on the picture elements, e.g. UCR and half toning, and the determination of control data as required and conventional for the color printing unit 7, can take place in the unit 13 connected to unit 11. Of course, for the purpose of the processing operations on raster picture elements or for determining control data, which take place in the units of the picture processing and control unit 6, the buffer memory means required for those rasters are present in those units. It is also permissible to operate the post-processing algorithm with half the resolution so that in fact a simplified calculation is obtained for the algorithm.

Figure 5:
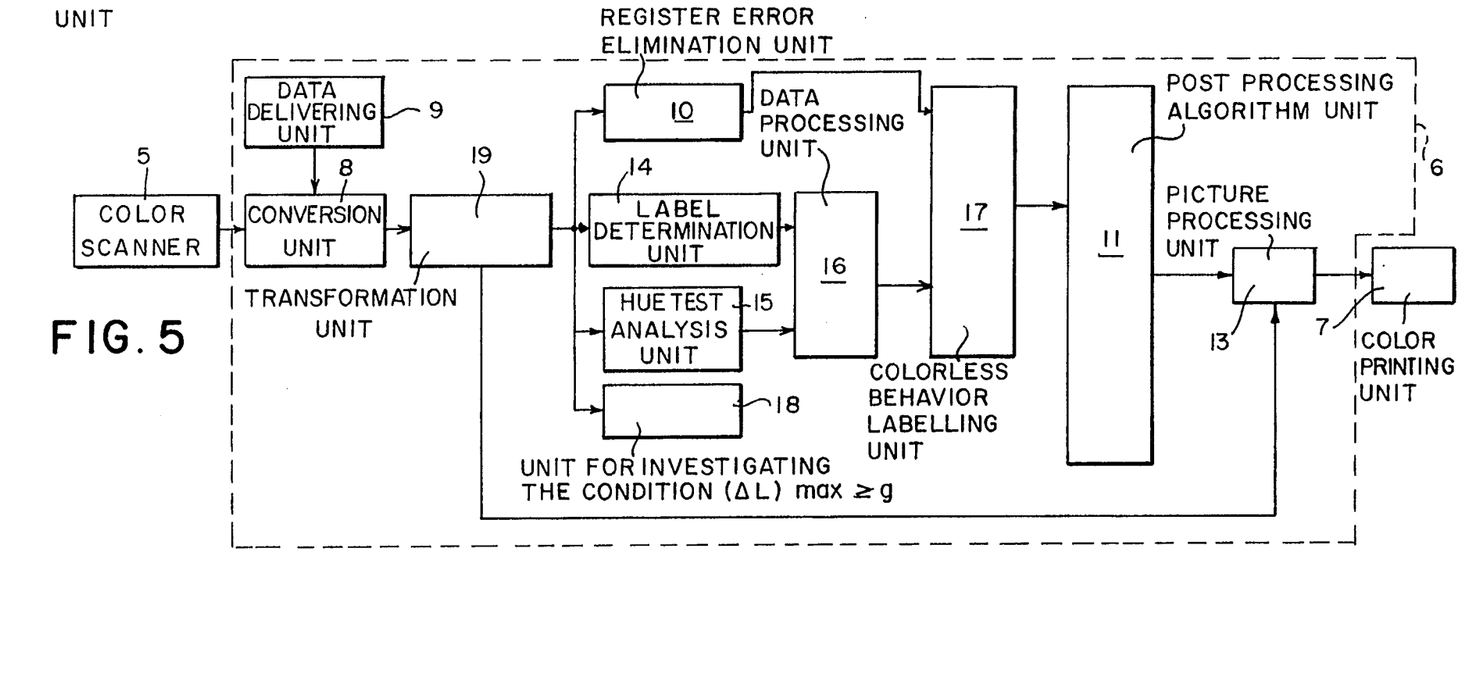
FIG. 5 diagrammatically illustrates a more practical embodiment of a part of a color reproduction system.

It is not necessary to perform the process steps in sequence as shown in FIG. 4. A more practical approach of the process events is obtained if a number of process steps are performed independently of one another and to some extent simultaneously as shown in the picture processing and control unit illustrated in FIG. 5. Thus, labeling according to the algorithm for the elimination of register errors in unit 10, determination of a color label, colorless label or provisional label for undefined color behavior in unit 14, and the "hue test" analysis in unit 15 can take place as parallel processes. A unit 16 receives and processes the results of the data to be supplied by units 14 and 15, in such manner that the data element of unit 14 is maintained if it relates to a color label or colorless label, but when it relates to a provisional label with undefined color behavior the result of unit 15 is taken over as a substituent data element. A unit 17 receives the data from units 10 and 16 and replaces a pertinent color behavior label delivered by unit 16 by a pertinent colorless behavior label only if unit 10 detects that the associated picture element must be colorless. A unit 18 is also present which for the purpose of the unit 11 operating in accordance with the post-processing algorithm is adapted to investigate the condition:

$$(\Delta L)_{max} \leq g$$

with respect to a given picture element in an added raster, or the alternative criterion already mentioned in this connection. The result of this test together with the result of unit 17 is fed to unit 11, which operates in accordance with the post-processing algorithm, in which for each picture element the final result is determined with respect to a color label or colorless label. The data delivered by unit 11 is then corrected and processed in unit 13 to give control signals for controlling a color printing unit 7. The units not referred to in connection with this Figure have a corresponding operation to those indicated by the same reference numeral in FIG. 4.

Some methods of processing picture information in accordance with the principle of the invention deliver such good results that it is permissible to omit the post-processing algorithm. In that case unit 11 acts as a kind of combination circuit which always allows an indication of colorless behavior generated by unit 10 to pass and, in the event of unit 10 not generating such indication, unit 11 allows the result of processing in unit 12 to pass.

The invention has been described above by reference to the LCH color space. However, of course, the principle of the invention is not restricted to this color space, but is also applicable to color spaces defined by parameters related to the parameters of the LCH color space.

The principle of the invention has been further described by reference to a single LC sub-space, and this is independent of the actual H value of a picture element to be examined. Perceptual observations show that a refinement of the invention with respect to the LC test is obtained by performing this LC test in a color-dependent manner. From practical considerations, however, it is impracticable to provide for each hue value a separate LC sub-space with an adapted distribution of the sub-space into the three areas. Instead, an LC sub-space for each hue value with an adapted distribution of that sub-space in the three areas is created for a number (n) of specific hue values. A separate FIG. 1 or FIG. 2 can then be added to each of these LC sub-spaces, in which the lines $l_1$ to $l_8$ occur with associated specific parameters. An applicable value could now be: n=16. With regard to assigning one of the types of indications, a Figure of this kind not only governs the associated hue value but also picture elements with hue values situated in an area around such a specific hue value. In performing an LC test for a certain picture element it is necessary first to establish the hue area that the picture element belongs to and hence which LC sub-space is applicable to that picture element. The associated indication with respect to any color behavior or the color fulfillment degree must then be determined from the associated FIG. 1 or FIG. 2. This is possible, for example, by means of a look up table which delivers the associated indication or color fulfillment degree to an LCH combination to be supplied.

It is also possible to apply the principle of the invention to an open color copying system in which picture information is transmitted from one or more external signal sources via a transmission system to the picture processing and control unit 6 of a color printing unit 7. In FIGS. 4 and 5, unit 5 then acts as the signal source. If the signal source delivers the picture information in the required color system, the LCH system in this case, the color conversion to be performed by units 8 and 9 by reference to a (white point) reference value should be carried out beside the signal source 5. If the picture processing and control unit 6 receives picture element information for each picture element comprising in addition to the associated color parameter values just a pertinent indication (or label) regarding a color behavior or colorless behavior, then the picture element should be tested, on the receiving side of the picture processing and control unit, for any possible occurrence in the uncertainty area, in order to assign the picture element a provisional indication regarding an undefined color behavior instead of the pertinent indication obtained. For this purpose, the picture processing and control unit should be provided with at least the following:

(a) memory means with positional data concerning a sub-space within the color space applied, such sub-space being considered an uncertainty area with respect to color behavior;

(b) selection means for selecting a picture element having positional data within the said uncertainty area by means of the memory means;

(c) means for performing an analysis concerning the distribution of parameter values related to the color space with respect to picture elements occurring within a defined environment of the picture element; and (d) means for assigning a pertinent indication on the basis of the results of the analysis performed with respect to the picture element.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method of assigning an indication or label with respect to color behavior to a picture element to be imaged with a color reproduction system, comprising:
   a. locating said picture element, on the basis of at least parameter values of said picture element related to color saturation and intensity, with respect to a defined sub-space within a color space, said sub-space being considered as an uncertainty area with respect to color behavior, said color space being defined by at least said parameter values of said color saturation and intensity;
   b. performing, with respect to said picture element upon being located in said uncertainty area, an analysis of a distribution of parameter values of said color space, of picture elements occurring within an environment of said picture element; and
   c. assigning a permanent indication to said picture element on the basis of said analysis.

2. A method according to claim 1, characterized in that said picture element upon being located in said uncertainty area is assigned said permanent indication of color behavior if a relative distribution of parameter values related to color with respect to said picture elements occurring in the said environment remains within predetermined limits.

3. A method according to claim 1, characterized in that said picture element upon being located in said uncertainty area is assigned said permanent indication of color behavior if an average value of said parameter values related to color saturation for said picture elements occurring in said environment exceeds a certain threshold.

4. A method according to claim 1, characterized in that said picture element upon being located in said uncertainty area is assigned said permanent indication of color behavior if both said relative distribution of said parameter values related to color with respect to said picture elements occurring in said environment remains within predetermined limits and an average value of said parameter values related to color saturation with respect to picture elements occurring in said environment exceeds a certain threshold.

5. A method according to claim 1, characterized in that the said picture element upon being located in said uncertainty area is assigned a color fulfillment degree which represents an expectation value of a picture element with respect to color behavior.

6. A method according to claim 5, further characterized in that said picture element upon being located in said uncertainty area is given a specific, permanent indication if said color fulfillment degree of said associated picture element is increased by a fraction of an average value of said fulfillment degree in said environment and after normalization of the result thus obtained is situated in a value area added to that specific, permanent indication.

7. A method according to claim 5, further characterized in that a picture element being located in said uncertainty area is given a specific, permanent indication if an average value of said fulfillment degree in said environment is situated in a value area added to said specific, permanent indication.

8. A method according to claim 5, further characterized in that said analysis is only based on picture elements to which a partial color fulfillment degree is assigned.

9. A method according to claim 5, further characterized in that said color fulfillment degree is represented by an angle information to be determined in an LC color sub-space associated with a straight line passing through a coordinate pair in said color sub-space representing said picture element and a predefined point in said color sub-space.

10. A method of assigning a permanent indication with respect to color behavior to a picture element to be imaged with a color reproduction system, comprising:
   a. testing if said picture element forms part of a text edge;
   b. assigning a permanent indication of colorlessness if said picture element forms part of said text edge;
   c. locating said picture element, on the basis of at least parameter values of the said picture element related to color saturation and intensity, with respect to a defined sub-space within a color space, said sub-space being considered as an uncertainty area with respect to color behavior, said color space being defined by at least said parameter values of said color saturation and intensity;
   d. performing, with respect to said picture element upon being located in said uncertainty area, an analysis of the distribution of parameter values in said color space, of picture elements occurring within an environment of said picture element;
   e. assigning a permanent indication to said picture element on the basis of said analysis; and
   f. assigning a single, permanent indication of colorlessness to said picture element as a substitute for any other permanent indications, only if said picture element has at least one permanent indication which is colorless.

11. A method of assigning a permanent indication with respect to color behavior to a picture element to be imaged with a color reproduction system, comprising:
   a. testing if said picture element forms part of a text edge;
   b. assigning a permanent indication of colorlessness if said picture element forms part of said text edge;
   c. if a permanent indication is not being assigned to said picture element, locating said picture element, on the basis of at least parameter values of said picture element related to color saturation and intensity, with respect to a defined sub-space within a color space, such sub-space being considered as an uncertainty area with respect to color behavior, said color space being defined by at least the parameters of the color saturation and intensity;
   d. performing, with respect to said picture element upon locating in said uncertainty area, an analysis of the distribution of said parameter values in said color space, of picture elements occurring within an environment of said picture element; and
   e. assigning a permanent indication to said picture element on the basis of said analysis.

12. A method according to claims 10 or 11, further characterized in that said situation of said picture element complies with that of a text edge if said picture element forms part of an edge having a high brightness transition and is situated in an area of picture elements of low color saturation.

13. A method according to claims 10 or 11, further characterized in that a permanent indication of color behavior is changed by an indication of colorlessness if, in a defined environment of said picture element, a number of picture elements having a permanent indication of color behavior is below a certain value.

14. A method according to claims 1, 10 or 11, further characterized in that determination of an indication of said color saturation and intensity with respect to a picture element is effected by reference to parameter values associated with such picture element and related to color value, color saturation and intensity.

15. A method according to claims 1, 10 or 11, characterized in that in locating said picture element in said color space with respect to said picture element, a choice is made from:
   a provisional indication concerning an undefined color behavior of a picture element if such picture element is situated in said uncertainty area within said color space;
   a permanent indication of color behavior of a picture element if such picture element is situated in a second area within said color space; and
   a permanent indication concerning colorlessness of a picture element if such picture element is situated in a third area within said color space.

16. A color reproduction system comprising
   a. means for generating color information point by point, provided with a picture processing and control unit for correcting and processing said color information to give control signals for controlling a color printing unit, said picture processing and control unit being adapted to assign a permanent indication with respect to color behavior to a picture element;
   b. memory means with positional data concerning a defined sub-space within a color space, said sub-space being considered an uncertainty area with respect to color behavior, said color space being defined at least by parameters related to color saturation and intensity;
   c. selection means for selecting a picture element having positional data within said uncertainty area by means of said memory means;
   d. means for performing an analysis of the distribution of parameter values in said color space with respect to picture elements occurring within a defined environment of said picture element; and
   e. means for assigning a permanent indication on the basis of the results of said analysis performed with respect to said picture element.

17. A color reproduction system comprising
a. a color scanning unit for scanning an original point by point and generating associated color information, provided with a picture processing and control unit for correcting and processing said color information to give control signals for controlling a color printing unit, said picture processing and control unit being adapted to assign a permanent indication with respect to color behavior to a picture element;
b. memory means with information concerning an indication of the occurrence of color at a picture element in a color space defined by at least parameters related to color saturation and intensity, said memory means arranged to distinguish:
a provisional indication concerning an undefined color behavior of a picture element if such picture element is situated in a first area within said color space;
a permanent indication of color behavior of a picture element if such picture element is situated in a second area within said color space; and
a permanent indication of colorlessness of a picture element if such picture element is situated in a third area within the said color space;
c. selection means for selecting from said memory means an indication concerning the occurrence of color with respect to each picture element on the basis of at least said associated parameter values of the said type and assigning such indication to the said picture element;
d. means for performing an analysis of the distribution of parameter values in said color space with respect to picture elements occurring within a defined environment of the said picture element; and
e. means for converting to a permanent indication said provisional indication associated with said picture element as obtained on the basis of the results of said analysis performed in the case of said picture element with said provisional indication.

18. A color reproduction system according to claims 16 or 17, further including a comparison means for selecting, in a defined environment, a maximum parameter value related to color and a minimum parameter value related to color and calculating the difference between the two color-related parameter values, and means for calculating an average color saturation value in the associated environment.

19. A color reproduction system according to claims 16 or 17, characterized in that said color reproduction system for a plurality of color values is provided with different memory means with information on an indication concerning the occurrence of color with respect to a picture element.

20. A color reproduction system according to claim 19, characterized in that said color reproduction system is provided with means whereby, by reference to a color value added to a picture element, memory means are assigned and selected which contain information on an indication concerning the occurrence of color with respect to a picture element.

* * * * *